(12) United States Patent
Enright et al.

(10) Patent No.: US 8,157,062 B2
(45) Date of Patent: Apr. 17, 2012

(54) WHEEL AND BRAKE ASSEMBLY

(75) Inventors: John J. Enright, Troy, OH (US); Jerry L. Miller, Kettering, OH (US); Joshua C. Houser, Wapakoneta, OH (US)

(73) Assignee: Goodrich Corporation, Charlotte, NC (US)

( * ) Notice: Subject to any disclaimer, the term of this patent is extended or adjusted under 35 U.S.C. 154(b) by 832 days.

(21) Appl. No.: 12/296,737

(22) PCT Filed: Apr. 11, 2007

(86) PCT No.: PCT/US2007/066419
§ 371 (c)(1),
(2), (4) Date: Oct. 10, 2008

(87) PCT Pub. No.: WO2007/118254
PCT Pub. Date: Oct. 18, 2007

(65) Prior Publication Data
US 2009/0277260 A1 Nov. 12, 2009

Related U.S. Application Data

(60) Provisional application No. 60/744,644, filed on Apr. 11, 2006.

(51) Int. Cl.
*F16D 55/36* (2006.01)
(52) U.S. Cl. ...................................... 188/71.5; 188/71.6
(58) Field of Classification Search ................. 188/71.5, 188/71.6; 301/6.1, 6.2, 6.8, 6.91, 6.3
See application file for complete search history.

(56) References Cited

U.S. PATENT DOCUMENTS

| | | | |
|---|---|---|---|
| 3,754,624 A * | 8/1973 | Eldred | 188/71.5 |
| 4,618,290 A * | 10/1986 | Hansen | 405/259.1 |
| 4,804,303 A * | 2/1989 | Statkus | 411/41 |
| 5,024,297 A | 6/1991 | Russell | |
| 5,186,521 A | 2/1993 | Niespodziany et al. | |
| 5,199,536 A * | 4/1993 | Clark | 188/264 G |
| 6,003,954 A | 12/1999 | Everhard et al. | |
| 7,051,845 B2 | 5/2006 | Thorp et al. | |
| 2003/0102710 A1 | 6/2003 | Thorp et al. | |
| 2007/0246995 A1* | 10/2007 | Scelsi et al. | 301/6.1 |

FOREIGN PATENT DOCUMENTS

EP 0 398 092 11/1990

OTHER PUBLICATIONS

International Search Report of International Application No. PCT/US2007/066419, filed Apr. 11, 2007, published in English as WO 2007/118254.

* cited by examiner

*Primary Examiner* — Christopher Schwartz
(74) *Attorney, Agent, or Firm* — Snell & Wilmer L.L.P.

(57) ABSTRACT

A wheel and brake assembly (10) having a torque bar (24) supported at a mid-span location. The torque bar (24) can be pre-loaded at a mid-span location. The pre-load can be effected by a spacer block (150) that is interposed between the wheel well and the torque bar (24). The method and device of the present invention can be used with existing wheel and brake assemblies. The spacer block can be a two-part spacer block.

16 Claims, 9 Drawing Sheets

WHEEL AND BRAKE ASSEMBLY

RELATED APPLICATIONS

This application is a national phase of International Application No. PCT/US2007/066413, filed Apr. 11, 2008, published in English as WO 2007/118254, which claims the benefit of U.S. Provisional Application No. 60/744,644 filed Apr. 11, 2006, which are hereby incorporated herein by reference.

FIELD OF THE INVENTION

The present invention relates generally to aircraft wheel and brake assemblies. More particularly, the invention relates to torque transmitting drive bars fastened to the radially inner surface of a wheel well of an aircraft wheel for engagement with brake rotors.

BACKGROUND OF THE INVENTION

Torque bars, also known as torque transmitting drive lugs, are employed in aircraft wheel and brake assemblies to couple the wheels to the rotors of the brake assembly. The torque bars typically extend parallel to the wheel axis and have an outboard end inserted in an aperture formed in the web of the wheel and an inboard end attached to a radially inner side of the wheel at the inboard end of the wheel. To minimize thermal conduction from the brake assembly to the wheel rim, the central portion of the torque bar is radially spaced from the well of the wheel, and usually a heat shield is located in this space.

Torque bars of the type just described are susceptible to vibration which can result in excessive torque bar deflection both radially and tangentially relative to the wheel. To overcome deflection problems, a common practice was to use relatively heavy torque bars to provide the necessary strength and resistance to deflection. This undesirably increases the weight of the wheel and brake assembly, which is particularly undesirable in aircraft.

SUMMARY OF THE INVENTION

The present invention provides a method and device for supporting torque bars used in a wheel and brake assembly to improve the dynamic stability of the torque bars with at most only a minor thermal penalty. The method and device reduces or substantially eliminates excessive vibration-induce deflections. In a preferred embodiment, a spacer block is interposed between the wheel and torque bar at a mid-span location along the torque bar. The spacer block, which preferably is made of an insulating material that may have some resilient compressibility, is compressed between the torque bar and wheel well. This provides effective resistance to radial vibration while frictional and/or mechanical interference between the spacer block and both the torque bar and wheel well resists tangential deflection of the torque bar during braking. As will be appreciated, the method and device of the present invention can easily be applied to retrofit existing wheel and brake assemblies to improve the operating characteristics of the torque bars and/or allow for the use of lighter and/or smaller torque bars.

In accordance with one aspect of the invention, a wheel assembly comprises a wheel including a wheel well, the wheel well being generally cylindrical and coaxial with a rotational axis of the wheel, and a torque bar secured to the wheel in a manner that maintains the torque bar in a state of flexure. In one embodiment, a spacer block is interposed between a radially inner surface of the wheel well and the torque bar. The torque bar is secured to the wheel by inserting an end of the torque bar into a hole in the wheel and bolting the opposite end of the torque bar to the wheel. The spacer block is thicker than the normal spacing between the radially inner surface of the wheel well and the unstressed torque bar such that the torque bar is pre-stressed by the spacer block when the torque bar is secured to the wheel.

In accordance with another aspect of the present invention, a torque bar assembly for use in an aircraft wheel comprises a torque bar and a spacer block. The spacer block is securable to the torque bar at a position between distal ends of the spacer block. The torque bar can include a button for mating with a recess in the spacer block for securing the spacer block against movement relative to the spacer block in at least one direction.

In accordance with yet another aspect of the invention, a wheel and brake assembly comprises a wheel including a wheel well, the wheel well being generally cylindrical and coaxial with a rotational axis of the wheel, and a torque bar connected to the wheel. A radially outer spacer block is secured to the wheel against circumferential movement and a radially inner spacer block is secured to the torque bar against movement transverse to the torque bar. The radially outer spacer block and radially inner spacer block are engaged with each other and movable with respect to each other at an interface therebetween. Friction between the radially outer spacer block member and the radially inner spacer block member damps movement of the torque bar.

In one embodiment, the radially outer spacer block member and the radially inner spacer block member are secured to the torque bar with a fastener. The fastener extends through openings in the outer spacer block member and the inner spacer block member, at least one of the openings being sized to permit relative movement between the radially outer spacer block member and the radially inner spacer block member at the interface therebetween. The fastener can preload the radially outer spacer block member and the radially inner spacer block member into engagement with each other. A spring washer can be configured to preload and/or maintain the radially outer spacer block member and the radially inner spacer block member into engagement with each other.

Further features of the invention will become apparent from the following detailed description when considered in conjunction with the drawings.

DETAILED DESCRIPTION

Figure 1:
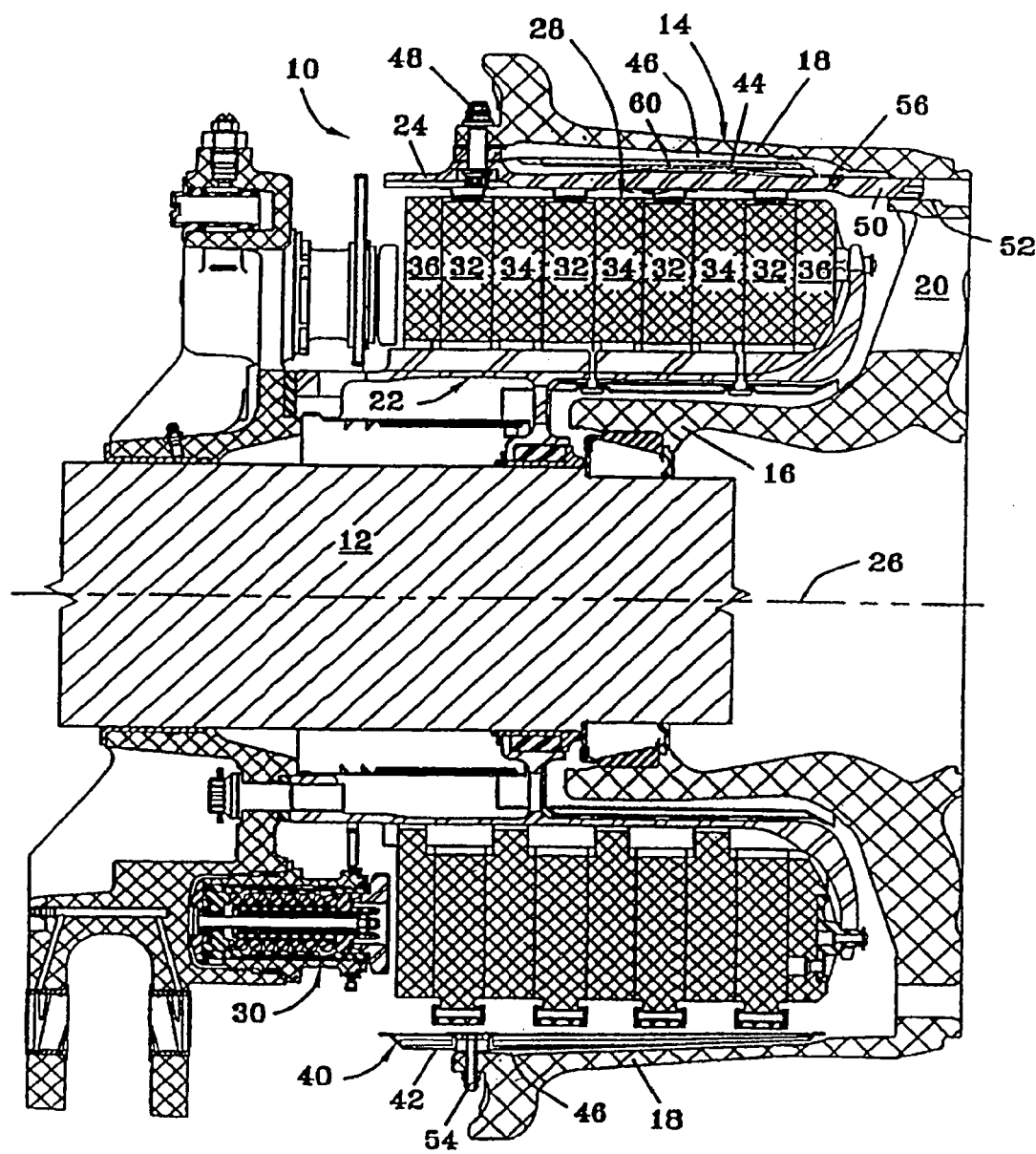
FIG. 1 is a cross-sectional view of a wheel and brake assembly.

Referring now to the drawings in detail and initially to FIGS. 1-5, an exemplary wheel and brake assembly is indicated generally by reference numeral 10. The wheel and brake assembly shown in FIGS. 1-5C is fully described in commonly assigned U.S. Pat. No. 7,051,845 which is hereby incorporated herein by reference in its entirety.

In FIG. 1, the aircraft wheel and brake assembly 10 is shown mounted on an aircraft bogie axle 12. The wheel and brake assembly 10 comprises a wheel 14 (only the inboard half of the wheel is shown in FIG. 1) having a hub 16 and a wheel well 18 concentric with the hub 16, and a web 20 interconnecting the hub 16 and the wheel well 18. A torque take-out assembly 22 is aligned with the hub 16, and the wheel 14 is rotatable relative to the torque take-out assembly 22.

Figure 2:
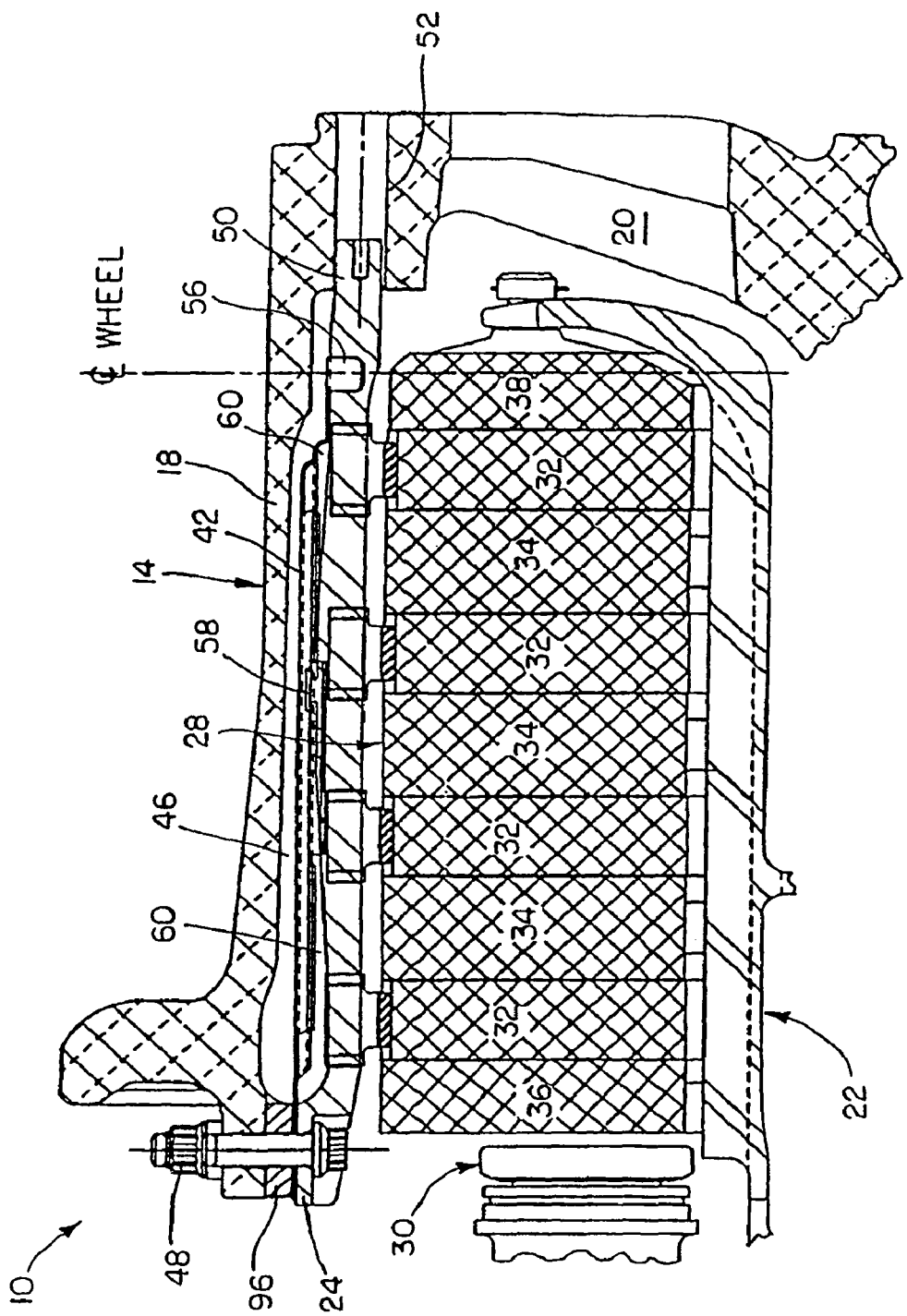
FIG. 2 is an enlarged portion of the cross-sectional view of the wheel and brake assembly of FIG. 1.

As shown in FIG. 2, a plurality of torque bars 24 are fixed to the wheel 14 generally parallel to the axis of rotation 26 of the wheel and spaced from the wheel well 18. A heat sink 28 is disposed within the wheel 14, and comprises brake or friction disks in the form of rotors 32 and stators 34. The rotors 32 are engaged with the torque bars 24 for rotation with the wheel, and the stators 34 are engaged with the torque take-out assembly 22 which is fixed against rotation relative to a landing gear strut (not shown). A pressure plate 36 and an end plate 38 may be positioned at opposite ends of the heat sink 28 and retained against rotation with respect to the torque take-out assembly 22. The friction disks may be formed from any material suitable for friction disks, including metals, such as steel with a sintered metallic friction lining, and ceramics or carbon materials, such as a carbon/carbon material. According to a preferred embodiment, the heat sink 28 is a carbon/carbon composite heat sink having at least one carbon/carbon rotor 32 interleaved with a plurality of carbon/carbon stators 34.

At least one actuator 30 (FIGS. 1 and 2) is provided to compress the heat sink 28. In the example presented, the actuator 30 is a hydraulically actuated piston, but other types of actuators may be used in the practice of the invention, such as electromechanical actuators.

Figure 3:
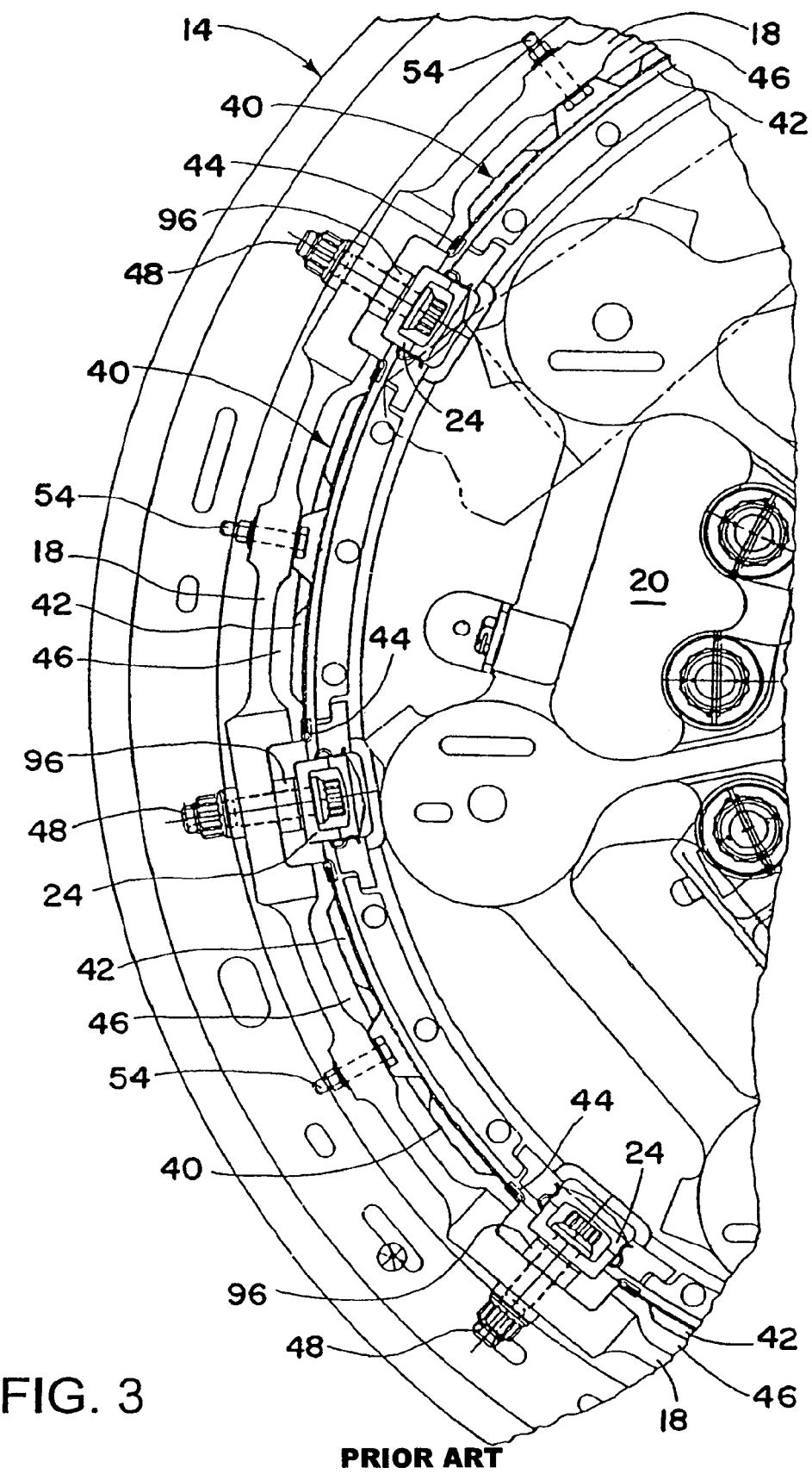
FIG. 3 is an arcuate portion of a front/inboard end view of the wheel and brake assembly of FIG. 1, looking into the wheel from the left side of FIG. 1.

A heat shield 40 is attached to the wheel 14 between the wheel well 18 and the heat sink 28. As illustrated in FIGS. 1 and 3, the heat shield 40 is concentric with the wheel well 18 and has a plurality of heat shield sections 42 disposed between respective, relatively adjacent pairs of torque bars 24. The heat shield sections are spaced from the wheel well 18 and secured in place by respective pairs of heat shield carriers 44 that are fixed to the wheel 14 generally parallel to the axis of rotation 26 of the wheel 14 intermediate the torque bars 24 and the wheel well 18. The carriers are preferably aligned with respective torque bars, and have "groove-like" side edges that define edge channels for axially receiving and radially constraining side edge tap portions of the heat shield sections, as described below with greater particularity.

The torque bars 24 and heat shield carriers 44 are attached at their axially inboard end to the wheel 14 by torque bar bolts 48. The torque bar bolts 48 extend through respective holes in a flange provided on the wheel as shown, which flange for purposes of the present description is intended to be considered as part of the wheel well. Each torque bar 24 preferably has a pin 50 at its axially outboard end (i.e., the end opposite the torque bar bolts 48) that is received within a hole 52 in the web 20 of the wheel.

After axial insertion between respective pairs of carriers 44, the heat shield sections 42 may be secured in place and to the wheel well 18 by suitable means, such as fasteners, and more particularly heat shield bolts 54 (FIGS. 1 and 3). Other securement devices may be employed.

In FIGS. 4A-4F, details of an exemplary torque bar 24 are shown. Each torque bar 24 is substantially rectangular-shaped in cross-section (FIG. 4F) and has a mounting hole 57 at its axially inboard end that receives the torque bar bolt 48.

Figure 4A:
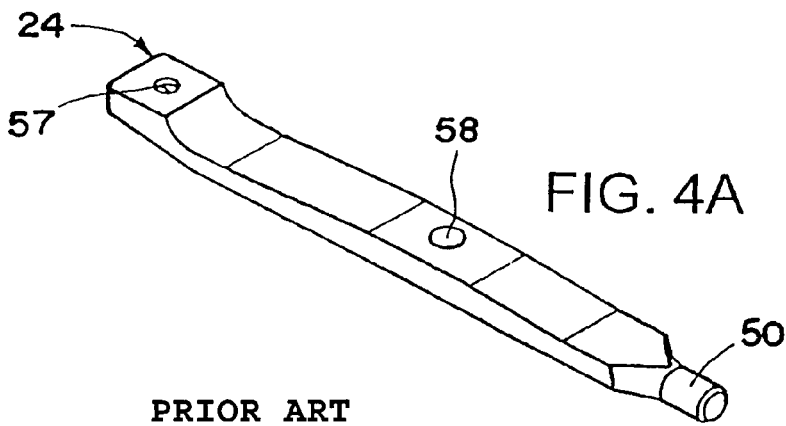
FIG. 4A is a perspective view of a torque bar used in the wheel and brake assembly of FIG. 1.
Figure 4B:
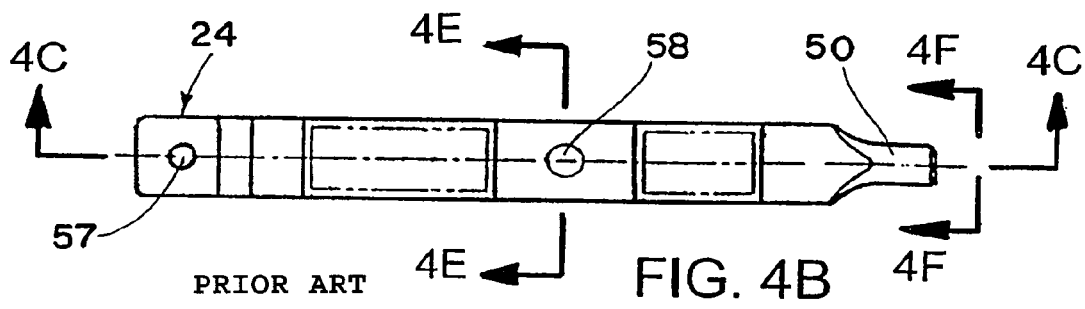
FIG. 4B is a top view of the torque bar.
Figure 4C:
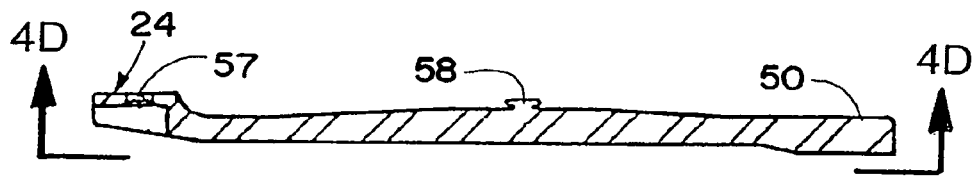
FIG. 4C is a longitudinal cross-sectional view of the torque bar taken along the line 4C-4C of FIG. 4B.
Figure 4D:
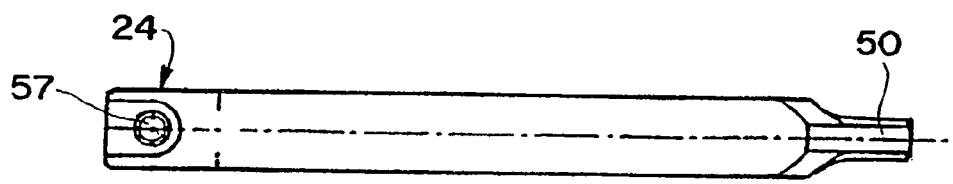
FIG. 4D is a bottom view of the torque bar looking from the line 4D-4D of FIG. 4C.
Figure 4E:
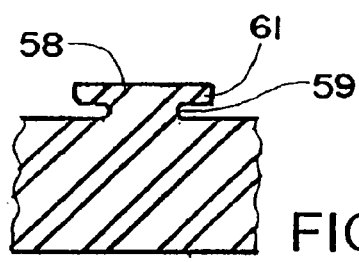
FIG. 4E is an enlarged transverse cross-sectional view of the torque bar taken along the line 4E-4E of FIG. 4B.
Figure 4F:
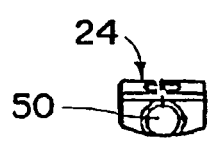
FIG. 4F is an end view of the torque bar as viewed from the line 4F-4F of FIG. 4B.

Each torque bar 24 also includes a coupling device in the form of a button 58 for coupling the heat shield carrier 44 to the torque bar 24 in the below described manner. As will be further described herein the button 58 also serves to secure a spacer block against axial and circumferential movement relative to the torque bar 24. As best shown in FIGS. 4C and 4E, the illustrated button 58 is T-shaped in cross section and includes a stem portion 59 which extends radially outward from the body of the torque bar 24 to an enlarged, circular-shaped head portion 61. The button 58 is located axially outwardly from the inboard end of the torque bar 24 and preferably is located between the inboard and outboard ends of the torque bar 24. As is also preferred, the button 58 is located along the neutral axis of bending of the torque bar 24 (i.e., the axial line located midway along the circumferential span of the torque bar 24). In the illustrated example, the T-shaped button 58 is located about midway between the inboard end and outboard end of the wheel well 18.

Figure 5A:
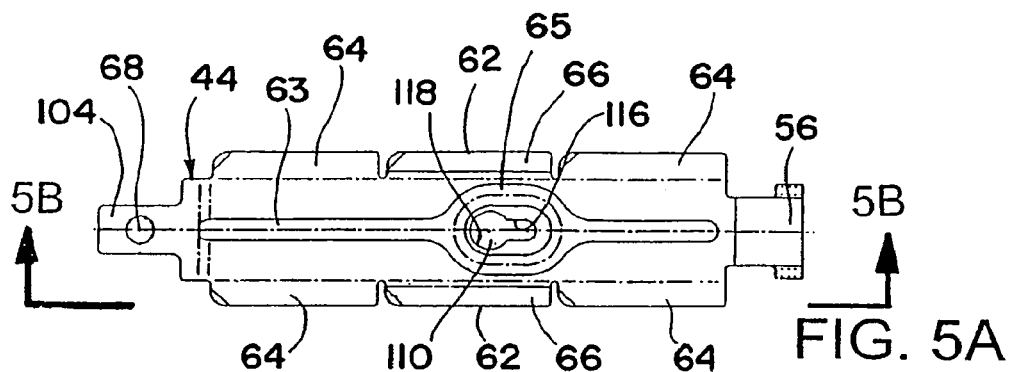
FIG. 5A is a top view of a heat shield carrier used in the wheel and brake assembly of FIG. 1.
Figure 5B:
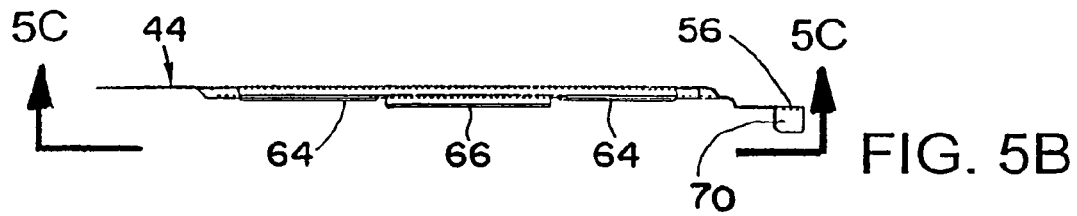
FIG. 5B is a side elevational view of the heat shield carrier of FIG. 5A looking from the line 5B-5B of FIG. 5A.
Figure 5C:
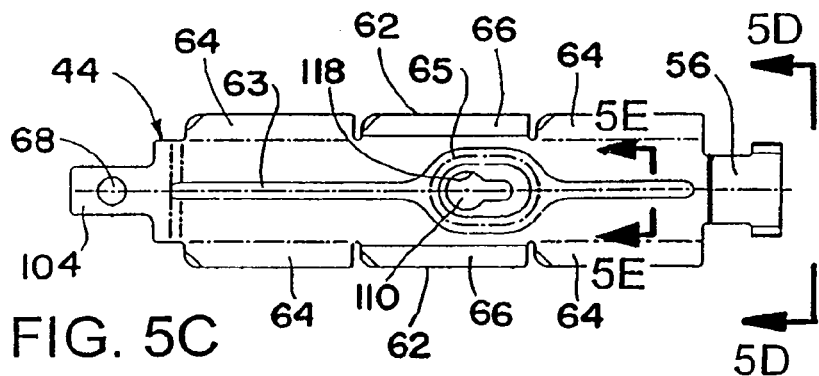
FIG. 5C is a bottom view of the heat shield carrier looking from the line 5C-5C of FIG. 5B.

In FIGS. 5A-5C, the heat shield carrier is shown in detail. A mounting hole 68 that receives the torque bar bolt 48 is provided in a mounting portion 104 of the heat shield carrier 44. As best seen in FIGS. 2 and 3, the mounting portion 104 is sandwiched between the torque bar 24 and the insulating spacer 96 which spaces the carrier 44 and torque bar 24 from the wheel 14 at the attachment location.

The heat shield carrier is provided with an aperture and more particularly a keyhole 110 for receiving and coupling with the button 58 of the torque bar 24. The keyhole 110 is thus located axially between the inboard end and outboard end of the wheel well 18. The keyhole 110 has a combined geometry of an axially extending slot 116 at its axially outboard end and a round hole 118 at the inboard end of the keyhole 110. The slot 116 has a width about equal to the stem 59 of the button 58 and less than the head 61 of the button 58, and the hole 118 has a diameter larger than the diameter of the head 61 of the button 58 for allowing passage therethrough of the head 61 of the button 58.

Figure 6:
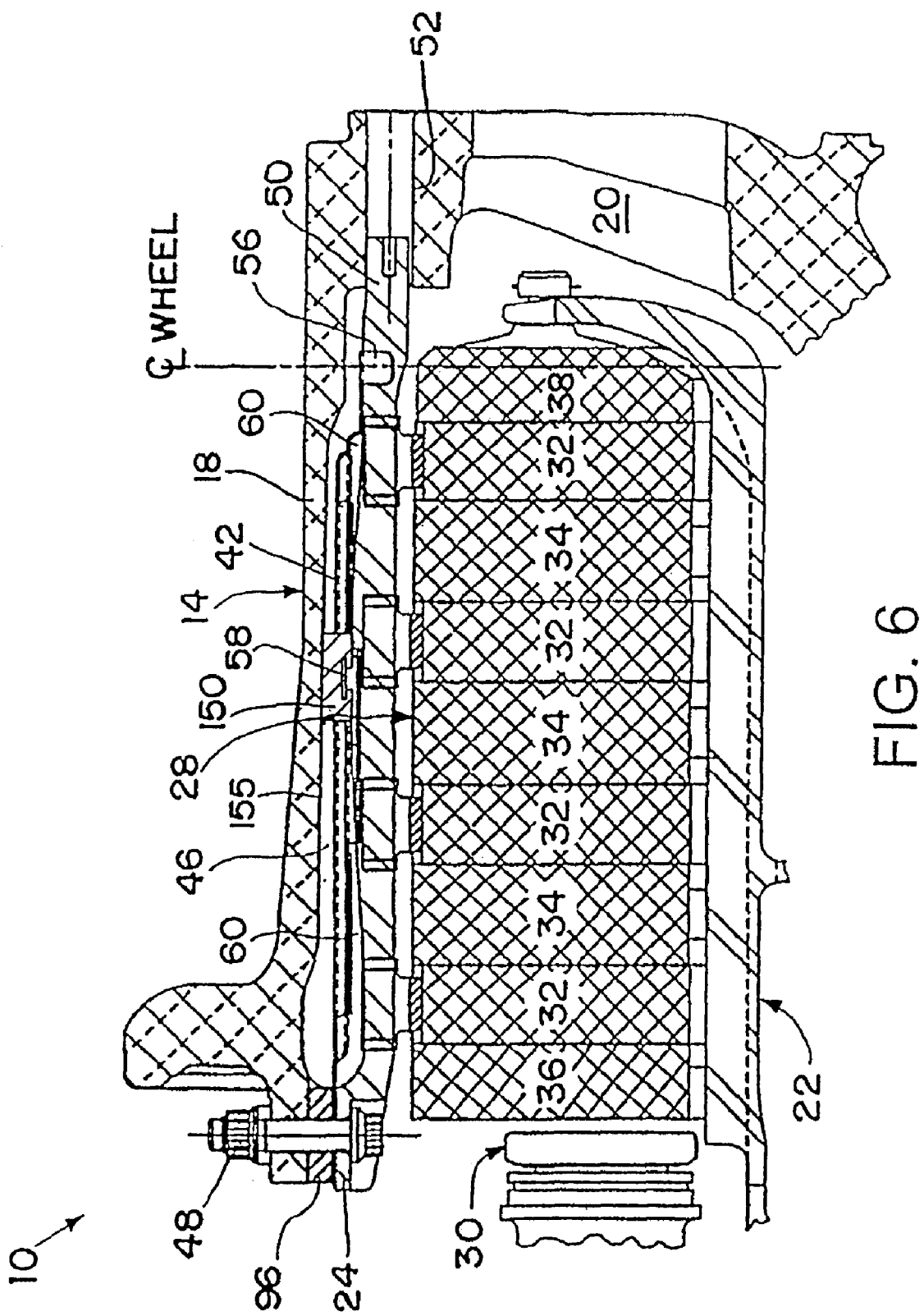
FIG. 6 is a partial cross-sectional view of one half of an aircraft wheel and brake assembly in accordance with the present invention.

Turning now to FIG. 6, and in accordance with the present invention, each torque bar 24 has associated therewith a mid-span support. In the illustrated embodiment, the mid-span support is a mid-span spacer block 150 that is interposed between a radially inner surface 155 of wheel well 18 and the torque bar 24 about midway between the ends of the torque bar 24 that are connected to the wheel. The spacer block 150 preferably is made of an insulating material that when not radially compressed, has a thickness greater than the distance between the torque bar 24 and the wheel well 18 when the spacer block 150 is not interposed between the tube well 18 and the torque bar 24, i.e., when the torque bar 24 is not pre-loaded. Consequently, when the spacer block 150 is installed between the torque bar 24 and the wheel well 18, the spacer block 150 will be compressed and will pre-load the torque bar 24. This pre-loading or pre-stressing of the torque bars 24 against the spacer block 150 reduces deflections of the torque bars 24 both radially and tangentially during braking. The amount of pre-load may be varied by varying the radial thickness of the spacer block 150, for example.

In the illustrated embodiment, the spacer block 150 is provided with a retention feature in the form of a recess 158. The recess 158 is provided in the radially inner surface of the spacer block 150 for capturing a protrusion on the torque bar, such as the button 58 on the torque bar 24. The button 58 cooperates with the recess 158 to restrict axial or circumferential movement of the spacer block 150 while the wheel well 18 and torque bar 24 capture the spacer block 150 in a radial direction. The upper surface of the spacer block 150 preferably is frictionally engaged with the radially inner surface 155 of the wheel well 18. Those skilled in the art will appreciate that other devices may be used for securing the spacer block 150 in place between the torque bar 24 and wheel well 18, such as, for example, suitable adhesives, mechanical fasteners, etc., although less desired.

The spacer block 150 may be installed between the torque bar 24 and the wheel well 18 before the torque bar bolt 48 has been tightened down against the torque bar 24. As the torque bar bolt 48 is tightened to draw the end of the torque bar 24 to the wheel well 18, the spacer block 150 will be compressed by the torque bar 24 thereby applying a pre-load to the torque bar 24, and compressing the spacer block 150 between the torque bar 24 and the inner surface 155 of the wheel. The torque bar 24 may resiliently flex radially inwardly to accommodate the spacer block 150 as the torque bar bolt 48 is tightened. As above mentioned, the amount of preload on the torque bar 24 and, consequently the compressive force applied to the spacer block 150, can be altered by adjusting the radial dimension of the spacer block 150, for example.

The radially outer surface 160 of the spacer block 150 preferably is curved or otherwise shaped to conform to the radially inner surface 155 of the wheel well 18. Frictional engagement and/or mechanical interference between the spacer block 150 and both the wheel well 18 and torque bar 24 in the tangential direction resists deflection of the torque bar 24 midway between the ends of the torque bar 24. Of particular note, however, is that in this embodiment such resistance to deflection, radially and/or tangentially, may be effected without fasteners piercing the torque bar 24 and/or wheel well 18 at a location between the ends of the torque bar 24 that are attached to the wheel 14.

During braking, the torque bar 24 may flex thereby causing movement of the spacer block 150 relative to the wheel well 18. Frictional and pre-load forces between the block 150 and the radially inner surface 155 of the wheel well 18 generally oppose such movement thereby acting to damp the flexing of the torque bar 24.

As above mentioned, the spacer block 150 preferably is made of an insulating material, i.e., a material having a relatively low thermal conductivity and relatively low compressive stiffness as compared to the torque bar 24. The insulating material may be the same type of insulating material heretofore used in wheel and brake assemblies, such as the material used to form the insulating spacer 96.

Once installed, the spacer block 150 prevents radially outward flexing of the torque bar 24, while the preload on the torque bar 24 opposes radially inward flexing of the torque bar 24. Frictional forces between the spacer block 150 and the radially inner surface 155 of the wheel well 18 resist and/or clamp circumferential flexing of the torque bar 24. The illustrated torque bar 24 with spacer block 150 can resist flexure under a wider range of dynamic vibrations thus making the wheel and brake assembly 10 more stable than a similar wheel and brake assembly without such torque bar 24 with spacer block 150.

It will be appreciated that for a given wheel and brake assembly, all of the torque bars can be provided with a spacer block. Alternatively, for a given application it may be desirable to install spacer blocks with less than all of the torque bars. For example, it may be suitable to install spacer blocks with two-thirds, or eve one-third, of the torque bars.

Figure 7:
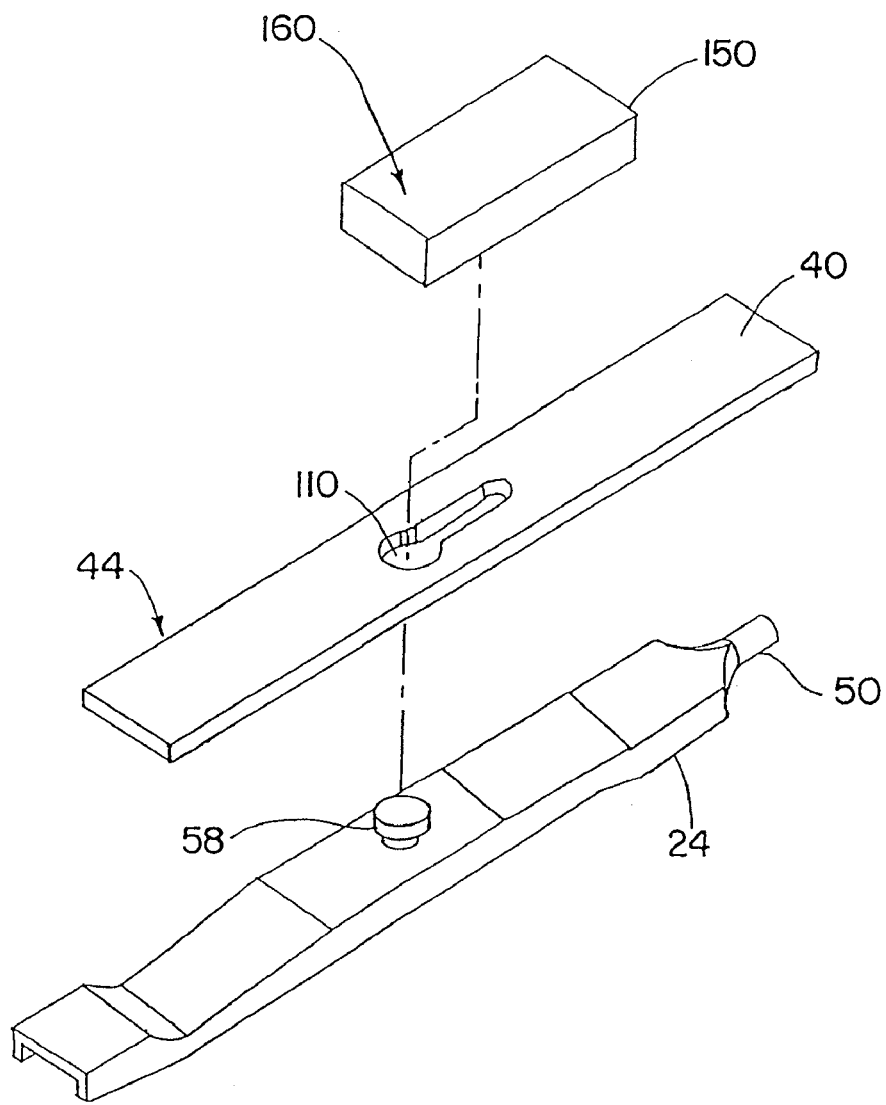
FIG. 7 is an exploded schematic illustration of a torque bar assembly in accordance with an exemplary embodiment of the present invention.
Figure 8:
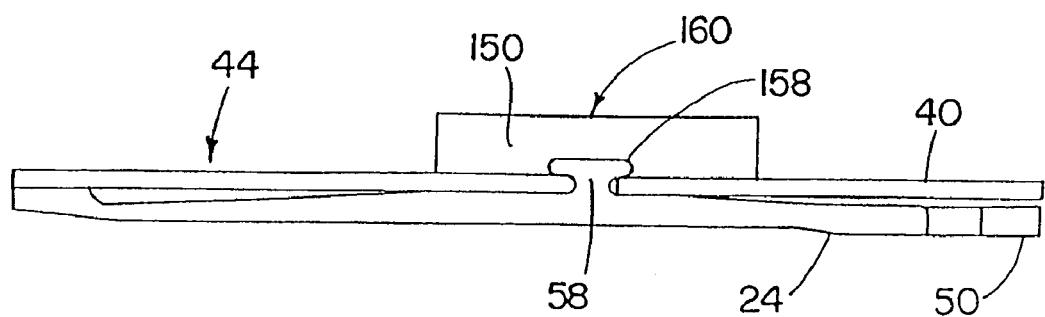
FIG. 8 is a cross-sectional view of the torque bar assembly of FIG. 7.

The spacer block 150 can be easily used in combination with a heat shield. As shown in FIGS. 7 and 8, a heat shield 40, specifically the heat shield carrier 44, can be sandwiched between the spacer block 150 and the torque bar 24. In other embodiments, the heat shield may be provided with an aperture for accommodating the spacer block 150. It will be appreciated, however, that in some applications the heat shield 40 can be omitted.

A wear surface may also be provided on the radially inner surface 155 of the wheel well 18. It will be understood that the spacer block 150 functions to create an interference against which the torque bar 24 can be preloaded. Therefore, and as desired or necessary, other elements between the torque bar 24 and the wheel well 18 can be utilized to create the interference.

In another embodiment, the spacer block 150 can be formed as part of the torque bar 24 and suitable insulating material can be interposed between the wheel well 18 and the spacer block 150 on the torque bar 24 to limit thermal conduction between the torque bar 24 and the wheel well 18.

The spacer block 150 can be used with existing wheel and brake assemblies generally without modification to the assembly. Thus, the present invention provides a way to retrofit existing wheel and brake assemblies with a spacer block 150 to support and preload the torque bar 24. This capability can be useful in situations were the unanticipated dynamic instability of a wheel and brake assembly otherwise renders the assembly unfit for use.

Similarly, should a spacer block 150, heat shield 40 or heat shield carrier 44, or other component be damaged such that replacement is needed before scheduled maintenance of the wheel and brake assembly 10, the wheel and brake assembly 10 may be disassembled to replace such components without disassembling the entire wheel assembly 10. For example, one or more damaged heat shield sections 40 may be replaced by removing the heat shield bolts 54 for those sections, axially withdrawing the damaged sections, inserting new sections, and replacing the heat shield bolts 54. This may be accomplished without removing the torque bar 24 and spacer block 150, thus greatly facilitating field repair of the wheel and brake assembly.

Figure 9:
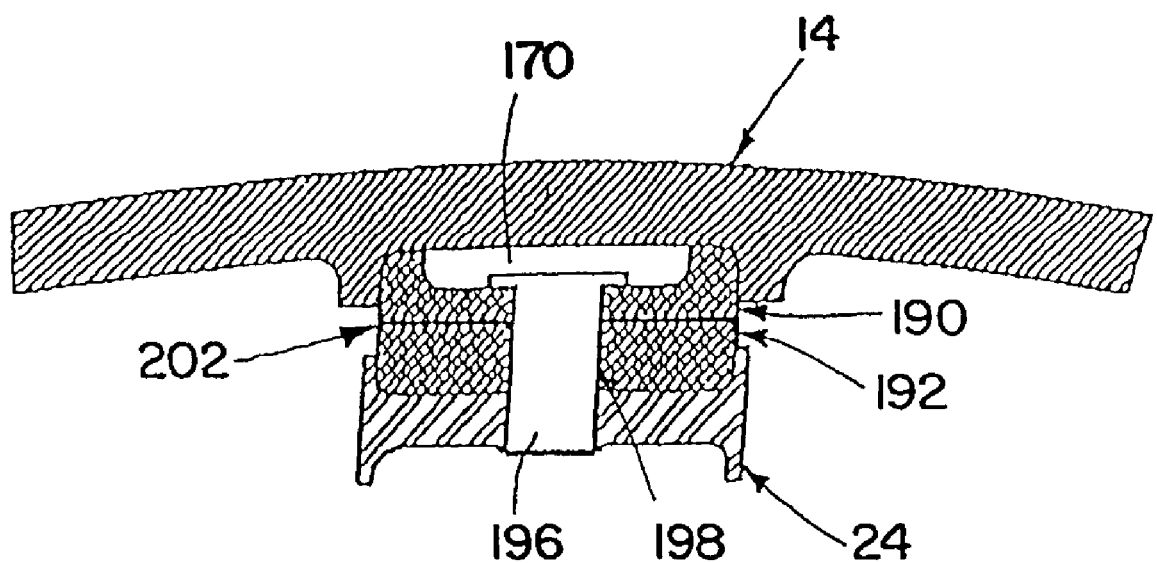
FIG. 9 is a cross-sectional view of a torque bar assembly in accordance with another exemplary embodiment of the present invention.

Turning to FIG. 9, another exemplary embodiment of the torque bar assembly is illustrated. In this embodiment, the torque bar assembly includes a radially outer spacer block member 190 and a radially inner spacer block member 192 secured to the torque bar 24 by a fastener, such as rivet 196. The outer spacer block member 190 is retained in recess 170 formed in the wheel 14 by shoulders 174. The shoulders 174 restrict circumferential movement of the outer spacer block member 190. The radially inner spacer block member 192 is retained in recess 178 in the torque bar 24.

Rivet 196 extends through openings 198 (e.g., a bore, a slot, etc.) in the outer and inner spacer blocks 190 and the torque bar 24. The rivet 196 acts to compress the outer and inner spacer blocks 190 and 192 against each other at interface 202. A clearance between the rivet 196 one or more of the openings 198 in the radially outer spacer block member 190 and/or the radially inner spacer block member 192 is provided to permit some relative movement between the radially outer spacer block member 190 and the radially inner spacer block member 192. Accordingly, it will be appreciated that some movement between the wheel 14 and the torque bar 24 is possible. In this embodiment, the torque bar 24 may or may not be preloaded depending on the application.

During braking, the torque bar 24 may flex thereby causing movement of the radially inner spacer block member 192 relative to the radially outer spacer block member 190. Frictional and/or pre-load forces between the radially inner spacer block member 192 and the radially outer spacer block member 190 generally oppose such movement thereby acting to damp the flexing of the torque bar 24. Unlike the embodiment of FIGS. 6-8 wherein the spacer block 150 can cause wear on the radially inner surface 155 of the wheel, in this embodiment wear is generally confined to the interface 202 of the radially outer spacer block member 190 and the radially inner spacer block member 192.

It will be appreciated that by adjusting and/or maintaining the amount of preload (e.g., clamping force) applied to the radially outer spacer block member 190 and the radially inner spacer block member 192, the rate of damping of the flexing of the torque bar 24 can be controlled and/or maintained.

Figure 11:
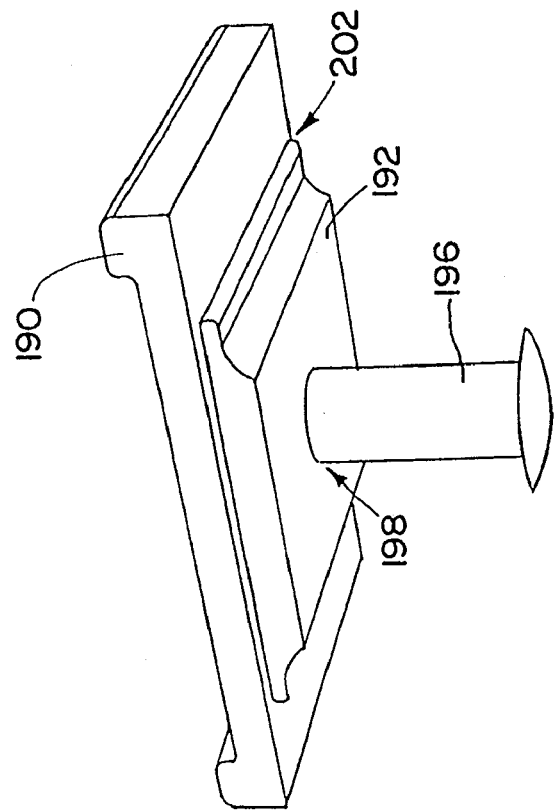
FIG. 11 is another perspective view of the torque bar assembly of FIG. 10.
Figure 10:
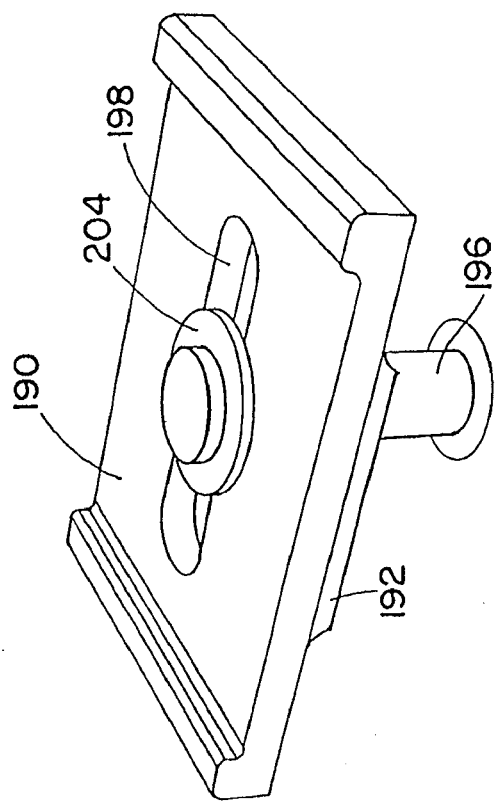
FIG. 10 is a perspective view of a torque bar assembly in accordance with yet another exemplary embodiment of the invention.

In FIGS. 10 and 11, another torque bar assembly in accordance with the invention is illustrated wherein the preload applied to the radially outer spacer block member 190 and radially inner spacer block member 192 can be controlled and/or maintained. In this embodiment, a spring washer 204 (e.g., a Belleville washer) is used in conjunction with rivet 196 to maintain a preload on the radially outer spacer block member 190 and the radially inner spacer block member 192. For clarity, the torque bar 24 is not shown in FIGS. 10 and 11, however, it will be appreciated that the rivet 196 would typically extend through the torque bar 24 in a similar manner to the embodiment shown and described in FIG. 9. Further, the torque bar may or may not be preloaded in this embodiment.

This embodiment is similar to the embodiment shown and described in connection with FIG. 9. The rivet 196, however, extends through opening 198 in the radially outer spacer block member 190, which in this embodiment is a slot. The rivet 196 also extends through a circular opening 198 (e.g., bore) in the radially inner spacer block member 192. As will be appreciated, the slot 198 permits movement between the radially outer spacer block member 190 and the radially inner spacer block member 192.

The spring washer 204 maintains a preload on the radially outer spacer block member 190 and the radially inner spacer block member 192. The spring washer 204 can be compressed a prescribed amount during installation of the rivet 196 such that a desired preload is achieved. During braking, as the torque bar assembly heats up and expands, the spring washer 204 can function to maintain a desired preload on the radially outer spacer block member 190 and the radially inner spacer block member 192. Similarly, as the radially outer spacer block member 190 and the radially inner spacer block member 192 wear at interface 202, the spring washer 204 can maintain a desired preload thereby preserving performance of the torque bar assembly.

Although the invention has been shown and described in the context of a torque bar 24 that is secured to a wheel and brake assembly by inserting a pin portion of a first end of the torque bar into a hole in the wheel and bolting the opposite end to the wheel, the invention can be used in connection with a wide variety of wheel and brake assemblies. By way of example, the invention can be used in a wheel and brake assembly wherein a torque bar is secured to the wheel at each end by bolts.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A torque bar assembly for use in an aircraft wheel comprising;
   a torque bar; and a spacer block; wherein the spacer block is coupled to the torque bar at a position between distal ends of the torque bar; and
   wherein the spacer block is a two-part spacer block having a radially outer spacer block member and a radially inner spacer block member, the radially outer spacer block member and radially inner spacer block member being engaged and movable relative to each other, and wherein the outer block member is in position to be engaged by the wheel when the torque bar assembly is assembled to the wheel.

2. A torque bar assembly as set forth in claim 1, further comprising a heat shield.

3. A torque bar assembly as set forth in claim 2, wherein the heat shield includes a keyhole for engaging the button to secure the heat shield to the torque bar.

4. A torque bar assembly as set forth in claim 1, wherein the torque bar includes a button and the spacer block includes a recess into which the button extends to secure the spacer block against movement relative to the spacer block in at least one direction.

5. A torque bar assembly as set forth in claim 1, wherein a radially inner portion of the spacer block is received in as recess of the torque bar.

6. A wheel and brake assembly comprising:
   a wheel including a wheel well, the wheel well being generally cylindrical and coaxial with a rotational axis of the wheel;

a torque bar connected to the wheel; a radially outer spacer block secured to the wheel against circumferential movement; and a radially inner spacer block secured to the torque bar against movement transverse to the torque bar;

wherein the radially outer spacer block and radially inner spacer block are engaged with each other and movable with respect to each other at an interface therebetween;

whereby friction between the radially outer spacer block member and the radially inner spacer block member damps movement of the torque bar.

7. A wheel and brake assembly as set forth in claim 6, wherein the outer spacer block member and inner spacer block member have a combined uncompressed thickness greater than the spacing between the radially inner surface of the wheel well and the torque bar when the spacer block members are not installed therebetween.

8. A wheel and brake assembly as set forth in claim 7, wherein the radially outer spacer block member and the radially inner spacer block member are secured to the torque bar with a fastener.

9. A wheel and brake assembly as set forth in claim 8, wherein the fastener extends through openings in the outer spacer block member and the inner spacer block member, at least one of the openings being sized to permit relative movement between the radially outer spacer block member and the radially inner spacer block member at the interface therebetween.

10. A wheel and brake assembly as set forth in claim 9, wherein the fastener preloads the radially outer spacer block member and the radially inner spacer block member into engagement with each other.

11. A wheel and brake assembly as set forth in claim 9, further comprising a spring washer configured to preload the radially outer spacer block member and the radially inner spacer block member into engagement with each other.

12. A wheel and brake assembly as set forth in claim 9, wherein the fastener is a rivet.

13. A wheel and brake assembly as set forth in claim 9, wherein the radially outer spacer block and radially inner spacer block are interposed between the wheel well and the torque bar in a manner that pre-loads the torque bar at a mid-span location.

14. A wheel and brake assembly as set forth in claim 7, wherein the torque bar is connected to the wheel in at least two axially spaced apart support locations, and wherein the radially outer spacer block member and the radially inner spacer block member are interposed between the radially inner surface of the wheel well and the torque bar at a location between the at least two support locations.

15. A wheel and brake assembly as set forth in claim 7, wherein the radially outer spacer block member is received in a recess in the wheel.

16. A wheel and brake assembly as set forth in claim 7, wherein the radially inner spacer block is received in a recess in the torque bar.

* * * * *